United States Patent [19]

Müller et al.

[11] Patent Number: 5,744,194

[45] Date of Patent: Apr. 28, 1998

[54] PROCESS AND DEVICE FOR COATING AT LEAST ONE OPTICAL WAVEGUIDE

[75] Inventors: Thomas Müller, Sonneberg; Frank Renner, Neustadt; Wilfried Reissenweber, Rödental; Reiner Schneider, Ebersdorf, all of Germany

[73] Assignee: Siemens Aktiengesellschaft, Munich, Germany

[21] Appl. No.: 666,395

[22] PCT Filed: Dec. 20, 1994

[86] PCT No.: PCT/DE94/01511

§ 371 Date: Jun. 21, 1996

§ 102(e) Date: Jun. 21, 1996

[87] PCT Pub. No.: WO95/17694

PCT Pub. Date: Jun. 29, 1995

[30] Foreign Application Priority Data

Dec. 23, 1993 [DE] Germany .................. 43 44 250.1

[51] Int. Cl.⁶ .................................................. B05D 5/06
[52] U.S. Cl. .................. 427/163.2; 118/125; 118/405; 118/420; 118/602; 427/356; 427/402; 427/434.4; 427/434.7

[58] Field of Search ................... 427/163.2, 356, 427/402, 434.4, 434.7; 118/125, 405, 420, 602

[56] References Cited

U.S. PATENT DOCUMENTS

| | | | |
|---|---|---|---|
| 4,474,638 | 10/1984 | Einsle | 156/494 |
| 4,810,429 | 3/1989 | Mayr | 264/1.5 |

FOREIGN PATENT DOCUMENTS

| | | |
|---|---|---|
| 0 087 757 | 9/1983 | European Pat. Off. . |
| 0 255 686 | 2/1988 | European Pat. Off. . |
| 0 532 999 | 3/1993 | European Pat. Off. . |
| 0 534 208 | 3/1993 | European Pat. Off. . |

*Primary Examiner*—Bernard Pianalto
*Attorney, Agent, or Firm*—Hill, Steadman & Simpson

[57] ABSTRACT

A process for coating at least one optical waveguide with a filling compound has at least two successive filling stages separated by a wiping device of reduced cross section. In the region of the wiping device, a proportion of the filling compound which is thus wiped off is led past the wiping device by a bypass and is fed once more to coat the optical waveguide in the second filling stage.

16 Claims, 3 Drawing Sheets

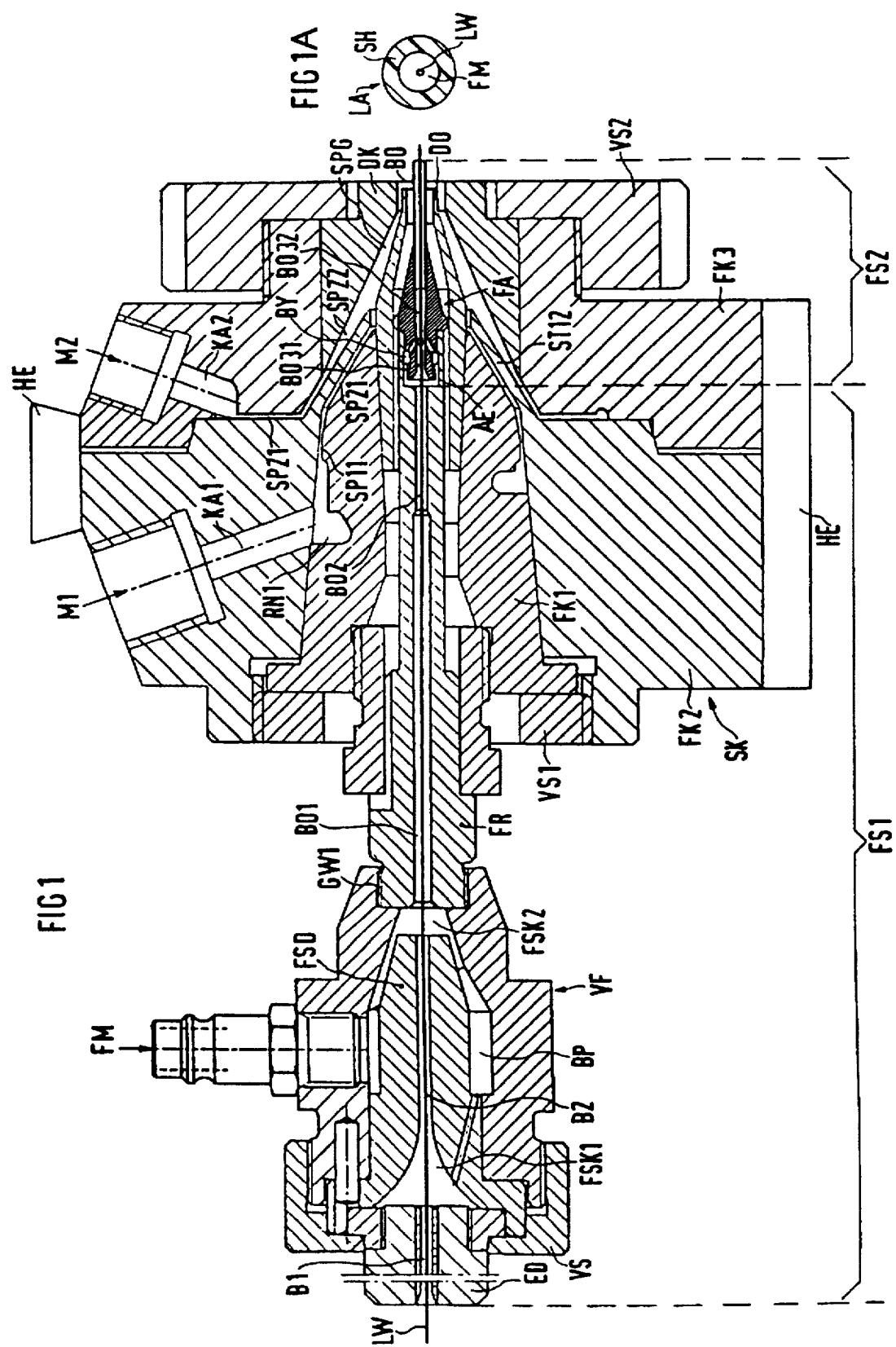

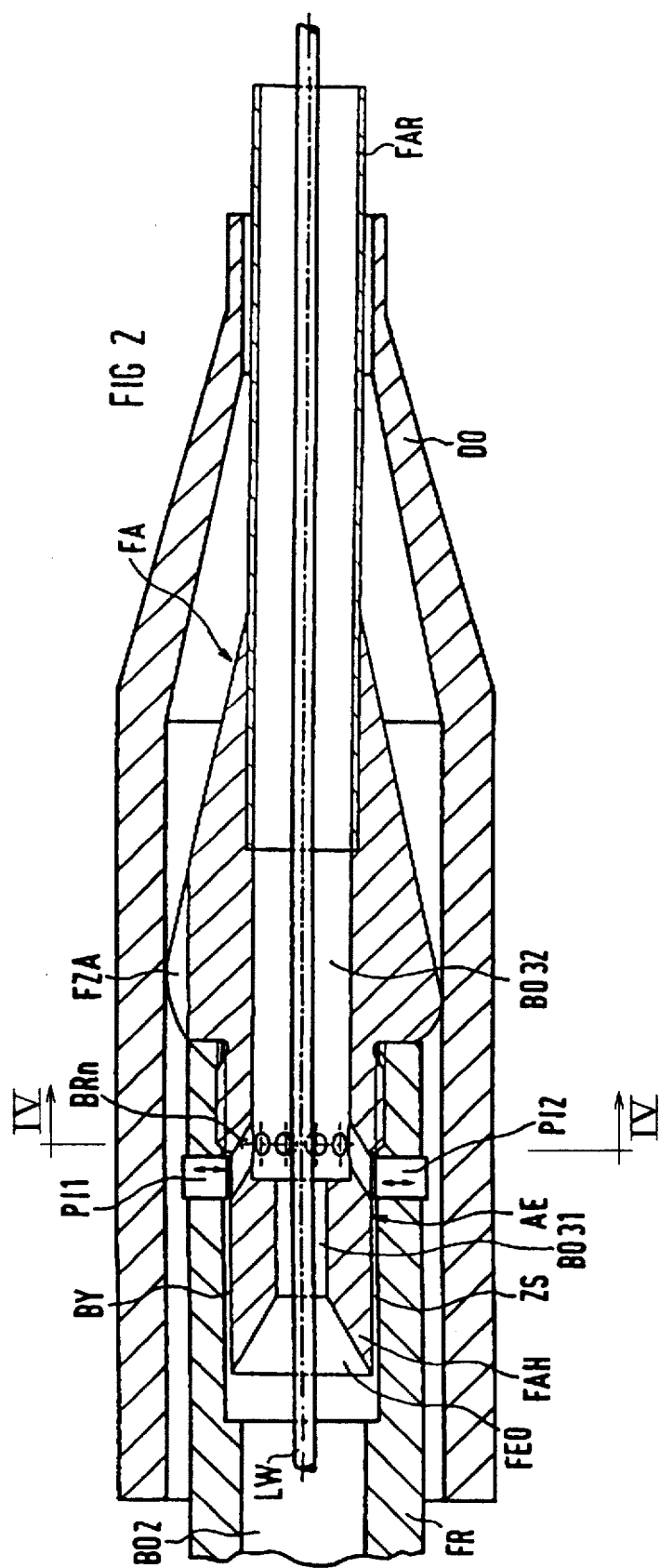
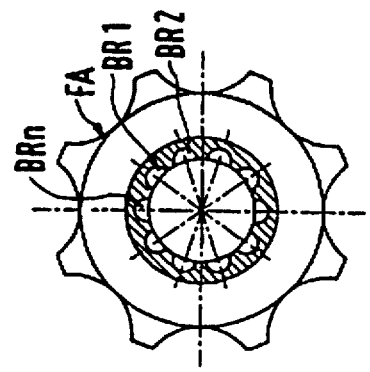
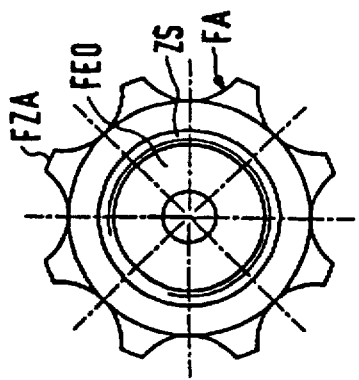

PROCESS AND DEVICE FOR COATING AT LEAST ONE OPTICAL WAVEGUIDE

BACKGROUND OF THE INVENTION

The invention relates to a process for coating at least one optical waveguide with a filling compound with the coating being undertaken in at least two successive filling stages and part of the filling compound being wiped off by means of a wiping device of reduced cross section between the filling stages.

A process of this kind is disclosed by EP 0 532 999. There, the filling compound is fed to a first filling chamber which is connected to a second filling chamber via a passage nozzle for the optical waveguide (or the optical waveguide bundle). This second filling chamber is located offset or upstream from the first filling chamber in a direction opposite or counter to the passage direction, of the waveguide and is connected to the first filling chamber via a bypass. As a result, it is possible for filling compound to be guided past the optical waveguide counter or opposite to the passage direction of the waveguide. Between the two filling stages, a wiping off of the filling compound takes place, which is achieved by means of a correspondingly reduced cross section of the passage nozzle. The position which the optical waveguide assumes inside the filling compound is not more closely defined, since the second filling stage has an outlet opening which is as large as is required by the desired material thickness of the filling compound.

SUMMARY OF THE INVENTION

The invention is based on the object of configuring the filling process to be as effective as possible and of ensuring a largely defined position of the optical waveguide within the filling compound. This object is achieved in the case of a process of the type mentioned at the outset by a proportion of the filling compound which is wiped off in the region of the wiping device being led past the optical waveguide via a bypass in the passage direction or direction of movement of the wavguide and subsequently being fed once more to coat the coated optical waveguide in the second filling stage.

Whereas, in the prior art according to EP 0 532 999, the filling compound is moved through the bypass in the passage direction counter to that of the optical waveguide, the bypass according to the invention represents a bridging over of the wiping device, that is to say part of the filling compound moves in the bypass in the same direction as the already coated optical waveguide (that is to say, in the passage direction). Via the bypass, a proportion of the filling compound is subsequently fed once more, specifically to the partially coated optical waveguide which is defined in terms of its position by the wiping device, in particular is centered. As a result it is possible to provide a sufficient quantity of filling compound for the optical waveguide, that is to say to guarantee good and secure embedding and at the same time to ensure that a defined position of the optical waveguide within the filling compound can be maintained.

The invention relates furthermore to a device for carrying out the process according to the invention, which is characterized in that a bypass is provided in the region of the wiping device, through which bypass a proportion of the filling compound which is wiped off can be led past the wiping device.

Other developments of the invention are reproduced in subclaims.

The invention and its developments are explained in more detail below with reference to drawings in which exemplary embodiments are shown.

BRIEF DESCRIPTION OF THE DRAWINGS

FIG. 1 is a longitudinal cross sectional view of a filling device, operating in accordance with the process of the present invention;

FIG. 1A is a transverse cross sectional view of a waveguide produced according to the present invention;

FIG. 2 is an enlarged longitudinal cross sectional view of the wiping device and bypass according to FIG. 1;

FIG. 3 is an end view of the left end of the wiping device of FIG. 2;

FIG. 4 is a cross sectional view taken on lines IV—IV of FIG. 2;

DESCRIPTION OF THE PREFERRED EMBODIMENT

Figure 5:
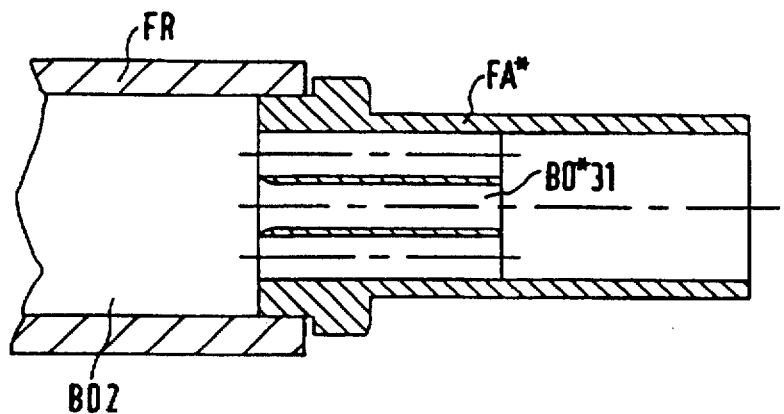
FIG. 5 is an enlarged longitudinal cross sectional view of another embodiment of the wiping device.

In FIG. 1, a filling device, containing two filling stages FS1 and FS2, is provided for the production of an optical waveguide strand LA (FIG. 1A) and at least one optical waveguide LW is fed to the device. Instead of an individual optical waveguide, a bundle of a plurality of optical waveguides can also be provided. The optical waveguide LW is fed through a bore B1 of an entry nozzle BD, of a prefilling stage, which nozzle ED is followed by two independent filling chambers FSK1 and FSK2. A filling compound FM is fed to the filling chamber FSK2, lying downstream as seen in the passage direction. Part of this filling compound FM passes via a bypass BP from the downstream filling chamber FSK2 into the first or upstream filling chamber FSK1, that is to say in the bypass BP the filling compound flows counter to the passage direction of the optical waveguide LW which is moved through a bore B2 of a guide nozzle FSD of reduced cross section. The construction and mode of operation of this filling device, containing two chambers, are described in more detail in the already mentioned EP 0 532 999. At the output of the filling chamber FSK2, an elongated guide tube FR which has in its interior a first (larger) bore BO1 and an adjoining (smaller) bore BO2, through which the optical waveguide LW is led, is screwed via a thread GW1 into the outer wall of the filling chamber FSK2. The guide tube FR has an attachment FA fitted to the front end thereof, which is shown enlarged in FIG. 2. The guide tube FR reaches into the interior of an extruder head SK, which is described in greater detail in EP 534 208. The extruder head SK provides for the application of a double protective sleeve to the optical waveguide LW coated with filling compound and, the compounds M1 and M2, which are necessary for this double layer sleeve are led via ducts KA1 and KA2. Adjoining the duct KA1 is an annular groove RN1. The compounds M1 and M2 pass via gaps SP11 and SP21 to guide ducts SP21 and SP22, running obliquely, between which there extends a web ST12. Subsequently, both compounds meet in a common conical duct SPG which ends in a bore BO. The outer diameter of this bore BO fixes the outer diameter of the sleeve SH of the optical waveguide strand LA to be produced. The protective sleeve SH is of a two-layer is and being formed from the materials M1 and M2 by coextrusion. The extruder head SK is composed of a heater HE and various guide elements FK1 (lying on the inside) and FK2 and FK3 (lying on the outside), and is held together by screw fixings VS1 and VS2. The common exit duct SPG is bounded on the outside by a wall DK and on the inside by a mandrel DO, which has a continuous bore into which the guide tube FR extends.

The filling process itself runs in such a manner that the filling compound FM is first led both into the filling chamber FSK2 and, via the bypass BP operated in countercurrent, into the filling chamber FSK1. As a result, a wetting or coating, which is reliable and carried out on all sides, of the optical waveguide LW (or of the optical waveguide bundle) is guaranteed with, air inclusions largely being avoided. The optical waveguide LW thus coated next passes into the bore BO1 of the guide tube FR, a certain centering and wiping effect already occurring as a result of the reduction in the cross section of the bore BO1 in comparison with the size of the filling chamber FSK2.

A renewed wiping effect and an additional improvement of the coating or wetting of the optical waveguide LW with the filling compound occurs as a result of the second bore BO2 which has a reduced cross section and is located downstream. The optical waveguide LW is guided by means of the small diameter of the small bore BO2 in a specific manner in terms of waveguide location, which could not be achieved in the case of correspondingly large bore cross sections.

In general, it is desirable and often necessary to embed the optical waveguide in as accurately defined a manner as possible, preferably centrally, in a sufficiently large quantity of filling compound. This is achieved at the entry of the second filling stage FS2 by means of a bore BO31, which has a reduced diameter as compared with the bore BO2, in an attachment FA which thus acts in its front part as a wiper AE. However, in order nevertheless to obtain a sufficient quantity of filling compound at the outlet of the attachment FA, a remedy is provided by the bore BO31 in the attachment FA being bridged over by means of a bypass BY. The bypass BY begins at the end of the bore BO2 and opens into the bore BO32, which is larger than the bore BO31, of the attachment FA. As a result, a corresponding proportion of the filling compound FM, which is wiped off and dammed up by the small bore BO31 in the attachment FA, is led via the bypass BY and is subsequently fed once more to the largely accurately centrally aligned optical waveguide LW. After the wiping device AE, the diameter of the bore BO31 increases to the size of bore BO32, as is required by the desired filling compound thickness within the protective sleeve SH of the optical waveguide strand LA (see FIG. 1A).

The details of the construction in the region of the wiping device AE according to FIG. 1 can be seen from the enlarged cross sectional representation of FIG. 2. The attachment FA is screwed into the interior of the guide tube FR, a sleeve-like extension FAB extending slightly into an end of the interior of the tube FR. In the extension FAH there is provided an entry opening FEO of conical design which merges into the bore BO31, which has a diameter which is greatly reduced in comparison with the bore BO2. The opening angle is expediently approximately 15° to 45°. The bore BO31 in the sleeve-like extension FAH serves as a wiping device AE, and the bore BO31 is selected to be only a little larger than the outer diameter of the optical waveguide LW or of any optical waveguide bundle. As a result, a very small but exactly defined quantity of the filling compound is still present on the optical waveguide or optical waveguide bundle; however, this quantity of the filling compound is not sufficient, for the desired cushioning effect within the strand sleeve SH. In order, nevertheless, to arrange a sufficiently large quantity of the filling compound around the optical waveguide, the bypass BY is provided, which initially has the form of a cylindrical gap ZS. This cylindrical gap ZS merges at its end via obliquely running individual bores BR1 to BRn, which are arranged in a crown shape, into the interior of the attachment FA, and the filling compound is fed once more to the coated optical waveguide LW at the end of the calibration bore BO31. Details can be seen from FIG. 4, which shows a cross section extending at right angles to the longitudinal axis of the attachment FA in the region of the oblique bores BR1 to BRn. The number of these obliquely or radially extending bores BR1 to BRn is selected to correspond to the additional filling compound feed. Likewise, the quantity of the filling compound which is fed can be set by the diameter of these oblique bores BR1 to BRn.

The following bore BO32 is of an enlarged diameter, specifically expediently enlarged to 1 to 2 times the diameter of the previous calibration bore BO31. The filling space thus additionally produced is filled up by the filling compound proportion fed via the bypass BY, and the optical waveguide LW, in the further course of the attachment FA, is exactly centrally embedded, that is to say at a location predetermined and defined by the calibration bore BO31, within the filling compound. The attachment FA has expediently a tubular extension FAR (internal diameter likewise BO32) on its output side. In this case, this extension, as can be seen from FIG. 1, is expediently designed to be of such a length that it reaches through the extruder head and only ends after the end of the annular nozzle BO, serving for the extrusion of the protective sleeve SH, of the injection head SK. The attachment FA is guided in the interior of the mandrel DO the extruder head SK and rests by means of webs FZA which are directed outward in the shape of a web (see FIG. 3, which shows a front view of the attachment FA, seen in the direction of the entry opening FEO) on the inner wall of the mandrel DO. By this means, it is ensured that as little heat as possible is transferred from the extruder injection head SK to the attachment FA. If necessary, a corresponding insulating layer can also be applied as an additional heat insulation, for example to the inner wall of the mandrel DO.

The extruded protective sleeve SH is pulled down at the output of the injection nozzle BO to the outer diameter of the tubular extension FAR and is therefore applied to the outer layer of the filling compound FM in a manner which is free of air and gaps. In particular, water repellent compounds, preferably containing oil components, are used as filling compounds. These expediently have thixotropic and/or thickening agents added to them.

The invention provides the possibility of carrying out a filling or coating process which is trouble-free, continuous and operates surely and reliably, for the filling compounds in the production of so-called hollow strands ("loose tubes"). The invention can be used in the case of single and multiple component compounds, compressible compounds, etc., that is to say it can be applied irrespective of the construction and composition of the filling compounds. The invention makes it possible to realize high passage speeds, for example of the order of magnitude of more than 100 m/min, and supplies optical waveguides or optical waveguide bundles which are positioned exactly centrally in the interior of the protective sleeve SH. Filling compound strands which are applied severely eccentrically can for example bring out disturbances in that the optical waveguide LW sticks to the inner wall of the extruded plastic sleeve during contraction. Also, in the case of the coating process according to the invention, any alignment errors in the passage direction of the optical waveguide LW and, for example, spatial deviations of individual components, for example of the extruder head SK with respect to the coating device VF are uncritical, since as a result of the wiping device AE and the bypass BY, any alignment errors are eliminated once more. A completely axially accurate alignment of all the elements of the filling device is thus not absolutely necessary.

It is expedient to arrange the wiping device AE at a specific distance after the prefilling device VF, specifically expediently at a distance of between 10 and 200 mm (corresponding approximately to the length of the tube FR).

Figure 6:
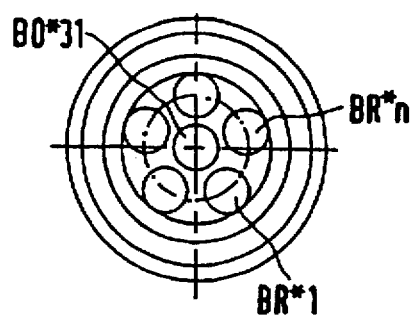
FIG. 6 is an end view of the right end of the wiping device of FIG. 5.

FIG. 5 shows an attachment FA* of modified design which, just as shown in the same way in FIG. 1, can be screwed into the guide tube FR at the outlet side end of the latter. As emerges from the front view according to FIG. 6, a centrally extending bore BO*31 is provided in the center, which (like BO31 in FIGS. 1 and 2) serves as a calibration nozzle and accommodates the optical waveguide LW or an optical waveguide bundle. Arranged on a part circle are n bores BR*1 to BR*n, which extend parallel to the central bore BR*31. These bores BR*1 to BR*n form the bypass for the wiped-off excess filling compound and the attachment FA* thus likewise represents a wiping device in contrast to the bore BO2 of the guide tube FR.

For the dimensioning of the various bores of the filling device shown in FIG. 1, the following considerations apply:

a) Coating an individual optical waveguide:

The bores B1, B2 and BO31 are selected to be only a little larger (expediently around 5–25%) than the outer diameter of the respective optical waveguide can be at a maximum (that is to say taking into account diameter fluctuations). The most central arrangement possible of the optical waveguide LW inside the protective sleeve SH of the optical waveguide strand LA can be achieved therewith.

Furthermore, it is ensured therewith that as little filling material as possible emerges from the filling chamber FSK1 via the entry nozzle ED counter to the passage direction of the optical waveguide LW to the left and is thus lost to the filling process.

The bore BO1 has an internal diameter which is expediently between 1.5 and 3 times the maximum outside diameter of the optical waveguide LW. The bore BO2 is selected to be larger than the bore BO31 of the wiping device AE and can expediently be selected between 1.3 and 2 times the outer diameter of the optical waveguide LW. In this range, by means of the application of a corresponding pressure, there results the advantageous possibility of achieving for the filling compound FM a higher flow speed (as a result of the small cross section of the bore BO2), which leads to a specific carrying-along effect occurring for the optical waveguide LW as a result of the greater (in contrast with the passage speed of LW) flow speed of the filling compound FM. This carrying-along effect leads to the - optical waveguide LW being virtually pushed forward, which can provide a contribution to setting the excess length of the optical waveguide LW with respect to the protective sleeve SH. The bore BO32 finally fixes the proportion of the filling compound FM within the protective sleeve SH and is therefore to be selected corresponding to the requirements on the respective optical waveguide strand LA. The bore BO32 and the bore BO2 are expediently selected to be approximately equally large. Since the bore BO31 is expediently virtually completely closed by the optical waveguide or the optical waveguide bundle, BO2 is expediently selected to be about as large as BO32.

b) Coating a bundle of optical waveguides:

The bore B1 and the bore B2, as well as the bore BO31, are selected such that the respective optical waveguide bundle can just be moved easily through the respective opening without seriously rubbing on its inner wall in each case. This means that the bores B1, B2 and BO31 are selected to be just a little larger than the outer contour of the smallest circle enclosing the respective optical waveguide bundle. In this case, it has proved to be expedient to select the bores B1, B2 and BO31 to be larger by about the diameter of an optical waveguide than the diameter of the circumcircle of the bundle. As a result, even in the case of any irregular arrangements of the optical waveguides, serious rubbing of the optical waveguide bundle on the inner wall of these bores can be avoided in virtually all cases.

The dimensioning of the bore BO2 can, as already mentioned above under a), be used in the generation of a thrust force on the optical waveguide bundle, by selecting a correspondingly narrow cross section, if this cross section is reduced by comparison with that of the bore BO1. As a result, there occurs a greater filling mass speed than the actual passage speed of the optical waveguide bundle, and a type of carrying-along effect is produced.

In the case of the above exemplary embodiments, it has been assumed that as central a position as possible for the arrangement of the optical waveguide or optical waveguide bundle within the protective sleeve SE is intended to be achieved. However, in many cases it can be expedient to aim for an exactly defined eccentric arrangement of the optical waveguides or optical waveguide bundles. This applies, for example, when directly after the production of the strand, a process of winding on a drum is intended, in which the optical waveguide is intended to be brought under tension into a path resting, for example, on the inner wall of the protective sleeve SH. For this purpose, by means of a simple modification of the construction, a contribution can be made as the result of, for example, providing pins PI1 and PI2 (FIG. 2) in the region of the gap ZS, which close specific oblique bores BR1-BRn for the flow of filling compound. For instance, if in FIG. 2 the pin PI1 is moved downward and the associated oblique bore is closed therewith, then in the upper part following the wiping device AE less filling compound joins in than in the lower part, where the corresponding pin PI2 does not close the oblique bore. This results in more filling compound being fed below than above, which leads to an eccentric arrangement of the optical waveguide, to be specific in a position shifted more upward. The control of these processes can be refined to such an extent that each of the oblique bores can be closed or opened, for example with a corresponding pin to be driven externally, as a result of which a fine metering of the eccentric arrangement of the optical waveguide within the protective sleeve can be carried out. However, it can also be sufficient to make, for example, each second or third oblique bore able to be closed with a corresponding pin.

If the pins, for example PI1, PI2 etc., are activated one after another in the peripheral direction, there results a displacement of the optical waveguide into various positions in relation to the longitudinal axis of the optical waveguide strand and thus, as a whole, an approximately helical course of the optical waveguide within the protective sleeve. A helical course of this type of the optical waveguide or of the optical waveguide bundle is particularly expedient if a relatively large percentage of excess length is desired. Such an eccentric incorporation of optical waveguides in an exactly defined manner is incidentally also possible by the attachment FA having a bore BO31 and BO32 which runs eccentrically, and the attachment FA is arranged as a whole so as to be rotatable within the mandrel DO. For this purpose, it is only necessary to connect the attachment FA to the guide tube FR by means of a corresponding rotary seal.

However, it is also possible to design the guide tube FR to be rotatable as a whole and to provide a corresponding rotary seal instead of the thread GW1. In this case, too, an eccentrically fitted calibration bore BO31 produces an exactly defined helical course for the optical waveguide the optical waveguide bundle LW within the filling pound FM.

We claim:

1. In a process for coating at least one optical waveguide with a filling compound, the coating being undertaken in at least two successive filling stages and part of the filling compound being wiped off by means of a wiping device of a reduced cross section between a first and second filling stages, the improvement comprising feeding a proportion of the filling compound which is wiped off in the region of the wiping device past the wiping device in the passage direction of the optical waveguide via a bypass to the second filling stage for coating the optical waveguide with filling compound in the second filling stage.

2. In a process according to claim 1, which includes leading the optical waveguide upstream of the wiping device in at least one region having a cross section which is greater than the diameter of the wiping device.

3. In a process according to claim 1, which includes, before passing through the first filling stage, precoating of the optical waveguide with a filling compound using a prefilling device.

4. In a process according to claim 1, wherein the step of feeding the proportion of the wiped-off filling compound via the bypass feeds the proportion via bores.

5. In a process according to claim 1, wherein the step of wiping is carried out in the interior of an extruder head.

6. In a process according to claim 1, which, after the wiping step, includes moving the optical waveguide coated with the filling compound through a guide tube.

7. In a device for coating at least one optical waveguide with a filling compound, said device having at least two successive filling stages for the coating of the waveguide and, between the filling stages, a wiping device of reduced cross section being provided, which wiping device wipes off part of the filling compound, the improvement comprising a bypass being provided in the region of the wiping device, said bypass carrying a proportion of the filling compound which is wiped off past the wiping device to the second filling stage so that the optical waveguide is coated with filling compound in the second filling stage.

8. In a device according to claim 7, wherein the wiping device is fitted in an attachment which, for its part, is fastened to a guide tube.

9. In a device according to claim 8, wherein a calibration nozzle of reduced cross section is provided in the region of the wiping device.

10. In a device according to claim 9, wherein the calibration nozzle is selected to be only slightly larger than the outer diameter of the optical waveguide or of the optical waveguide bundle.

11. In a device according to claim 7, wherein the bypass is formed by a cylindrical gap and by adjoining bores which preferably run obliquely inward in the direction of the optical waveguide.

12. In a device according to claim 7, wherein the bypass is formed by bores which extend approximately axially parallel.

13. In a device according to claim 7, wherein the wiping device has a cone-shaped inlet opening of which the opening angle is selected between 15° and 45°.

14. In a device according to claim 7, wherein a calibration nozzle of a reduced cross section is provided in the region of the wiping device.

15. In a device according to claim 14, wherein the calibration nozzle is selected to be only slightly larger than the outer diameter of the optical waveguide or the optical waveguide bundle.

16. In a device according to claim 14, wherein the bypass is formed by bores extending axially parallel to the calibration nozzle.

* * * * *